(12) United States Patent
Brancheriau

(10) Patent No.: US 9,771,107 B2
(45) Date of Patent: Sep. 26, 2017

(54) DEVICE FOR ATTACHING A FIRST SUB-ASSEMBLY TO A SECOND SUB-ASSEMBLY IN AN AUTOMOBILE

(75) Inventor: Christian Brancheriau, Herblay (FR)

(73) Assignee: FAURECIA INTERIEUR INDUSTRIE, Nanterre (FR)

( * ) Notice: Subject to any disclaimer, the term of this patent is extended or adjusted under 35 U.S.C. 154(b) by 1564 days.

(21) Appl. No.: 12/864,096

(22) PCT Filed: Oct. 2, 2008

(86) PCT No.: PCT/FR2008/051785
§ 371 (c)(1),
(2), (4) Date: Jul. 22, 2010

(87) PCT Pub. No.: WO2009/095571
PCT Pub. Date: Aug. 6, 2009

(65) Prior Publication Data
US 2010/0289296 A1    Nov. 18, 2010

(30) Foreign Application Priority Data
Jan. 28, 2008   (FR) ..................................... 08 50503

(51) Int. Cl.
| | |
|---|---|
| *B60K 37/00* | (2006.01) |
| *B25B 27/14* | (2006.01) |
| *F16B 7/00* | (2006.01) |
| *B62D 25/14* | (2006.01) |
| *F16B 35/04* | (2006.01) |

(52) U.S. Cl.
CPC .......... *B62D 25/147* (2013.01); *F16B 35/041* (2013.01); *Y10T 29/53961* (2015.01); *Y10T 403/24* (2015.01)

(58) Field of Classification Search
CPC ................. B62D 25/147; F16B 35/041; Y10T 29/53961; Y10T 403/24

USPC ....................................... 296/193.02, 70, 72
See application file for complete search history.

(56) References Cited

U.S. PATENT DOCUMENTS

2006/0138806 A1    6/2006   Arroupe et al.

FOREIGN PATENT DOCUMENTS

| FR | 2 874 582 A1 | 3/2006 |
|---|---|---|
| FR | 2 882 022 A1 | 8/2006 |
| FR | 2 907 415 A1 | 4/2008 |
| FR | 2 907 522 A1 | 4/2008 |

(Continued)

OTHER PUBLICATIONS

International Search Report, dated Mar. 19, 2009, from corresponding PCT application.

*Primary Examiner* — Glenn Dayoan
*Assistant Examiner* — Melissa A Black
(74) *Attorney, Agent, or Firm* — Young & Thompson

(57) ABSTRACT

An attachment device (1) includes:
  a female member (25);
  a male member (29) which is capable of insertion into the inner cavity (27) of the female member (25) in an insertion direction;
  a blocking member (31) which is movable relative to the female member (25), inside the inner cavity (27), between a rest position and an operative position for blocking the male member (29) relative to the female member (25). The attachment device does not have an actuator capable of moving the blocking member (31) from its rest position to its operative position, the blocking member (31) being movable from its rest position to its operative position by an actuator arranged outside the inner cavity (27).

20 Claims, 9 Drawing Sheets

(56) References Cited

FOREIGN PATENT DOCUMENTS

| WO | 02/46627 A1 | 6/2002 |
|---|---|---|
| WO | 2006/105585 A1 | 10/2006 |

DEVICE FOR ATTACHING A FIRST SUB-ASSEMBLY TO A SECOND SUB-ASSEMBLY IN AN AUTOMOBILE

BACKGROUND OF THE INVENTION

Field of the Invention

The present invention relates generally to devices for attaching a first structural or functional sub-assembly to a second structural or functional sub-assembly in a motor vehicle, and in particular to a device for attaching a dashboard to the body of a vehicle.

BRIEF SUMMARY OF THE INVENTION

More precisely, the invention relates to a device for attaching a first structural or functional sub-assembly to a second structural or functional sub-assembly of a motor vehicle, of the type comprising:
- a female member which is connected to the second sub-assembly and defines an inner cavity on the inside;
- a male member connected to the first sub-assembly, the male member being capable of insertion into the inner cavity of the female member in an insertion direction;
- a blocking member which is movable relative to the female member, inside the inner cavity, between a rest position, in which the blocking member allows the male member to be inserted into the female member in the insertion direction, and an operative position, in which the blocking member cooperates with the male member in order to block the male member relative to the female member, at least in the insertion direction.

Such a device is known from the patent application filed under number FR05 01433, in which the blocking member is described as being a rotary cam which cooperates with a portion of the male member forming a cam follower. The blocking member is urged towards its operative position by a torsion spring accommodated in the female member. This device has the disadvantage that it has a large number of parts, is heavy and is particularly expensive.

Within this context, the invention aims to propose an attachment device which is simpler, lighter and less expensive.

To that end, the invention relates to an attachment device of the above-mentioned type, characterized in that the attachment device does not have an actuator capable of moving the blocking member from its rest position to its operative position, the blocking member being movable from its rest position to its operative position by an actuator arranged outside the inner cavity.

The attachment device can also have one or more of the features below, taken individually or in all technically possible combinations:
- the attachment device is arranged to attach the first sub-assembly in a predetermined use position relative to the second sub-assembly, the first sub-assembly being movable to the use position by a gripper, the blocking member being movable from its rest position to its operative position by a linear actuator connected to the gripper,
- the attachment device comprises braking means capable of holding the blocking member in its rest position when said blocking member is urged towards its operative position with a degree of intensity less than or equal to a predetermined limit, and of allowing the blocking member to move from its rest position towards its operative position when said blocking member is urged towards its operative position with a degree of intensity greater than said predetermined limit,
- the attachment device comprises anti-return means capable of blocking the movement of the blocking member from its operative position towards its rest position,
- the attachment device comprises a transmission member having an inner portion, which is arranged in the inner cavity and is connected to the blocking member, and a head, which is arranged outside the inner cavity and is capable of cooperating with the actuator, the transmission member having at least one degree of freedom relative to the female member,
- the transmission member is a screw, the inner portion of which comprises a threaded zone, the blocking member comprising a tapped hole in which the threaded zone is engaged so as to allow the blocking member to move relative to the female member along the screw under the effect of the rotation of the screw relative to the blocking member,
- the transmission member comprises an outer portion, which is located outside the inner cavity, and a plastics material overmoulded on the outer portion, the plastics material defining braking means capable of holding the blocking member in its rest position when said blocking member is urged towards its operative position with a degree of intensity less than or equal to a predetermined limit, and of allowing the blocking member to move from its rest position towards its operative position when said blocking member is urged towards its operative position with a degree of intensity greater than said predetermined limit,
- the overmoulding of plastics material defines anti-return means capable of blocking the movement of the blocking member from its operative position towards its rest position,
- the female member comprises tongues which are arranged to cooperate with the transmission member and define braking means capable of holding the blocking member in its rest position when said blocking member is urged towards its operative position with a degree of intensity less than or equal to a predetermined limit, and of allowing the blocking member to move from its rest position towards its operative position when said blocking member is urged towards its operative position with a degree of intensity greater than said predetermined limit,
- the tongues define anti-return means capable of blocking the movement of the blocking member from its operative position towards its rest position,
- the transmission member comprises an outer portion, which is located outside the inner cavity, and a shoulder, which is formed in the outer portion and is capable of abutment against the tongues, the blocking member being movable from its rest position to its operative position by a second rotary actuator capable of acting upon the head of the transmission member so as to cause the transmission member to rotate relative to the blocking member in a direction effecting movement of the blocking member relative to the female member along the transmission member from its rest position towards its operative position, the shoulder of the outer portion being in abutment against the tongues during at least part of said movement of the blocking member.

According to a second aspect, the invention relates to a process for attaching a first structural or functional assembly to a second structural or functional sub-assembly of a motor vehicle with the aid of an attachment device having the above features, the process comprising the following steps:
- movement of the first sub-assembly to a predetermined use position relative to the second sub-assembly with the aid of a gripper;
- insertion of the male member into the inner cavity of the female member;
- movement of the blocking member relative to the female member, inside the inner cavity, from its rest position to its operative position with the aid of an actuator connected to the gripper.

According to a third aspect, the invention relates to a process for dismantling a first structural or functional sub-assembly attached to a second structural or functional sub-assembly of a motor vehicle with the aid of an attachment device having the above features, the process comprising a step in which the head of the transmission member is acted upon so as to cause the transmission member to rotate relative to the blocking member in a direction effecting movement of the blocking member relative to the female member along the transmission member from its operative position towards its rest position.

According to a fourth aspect, the invention relates to a process for re-mounting a first structural or functional sub-assembly attached to a second structural or functional sub-assembly of a motor vehicle with the aid of an attachment device having the above features, the process comprising a step in which the head of the transmission member is acted upon so as to cause the transmission member to rotate relative to the blocking member in a direction effecting movement of the blocking member relative to the female member along the transmission member from its rest position towards its operative position, the shoulder of the outer portion of the transmission member being in abutment against the tongues of the female member during at least the movement of the blocking member.

According to a fifth aspect, the invention relates to an assembly for attaching a first structural or functional sub-assembly to a second structural or functional sub-assembly of a motor vehicle, the attachment assembly comprising:
- an attachment device arranged to attach the first sub-assembly in a predetermined use position relative to the second sub-assembly;
- a gripper capable of moving the first sub-assembly to the use position;
- an actuator connected to the gripper;

the attachment device comprising:
- a female member which is connected to the second sub-assembly and defines an inner cavity on the inside;
- a male member connected to the first sub-assembly, the male member being capable of insertion into the inner cavity of the female member in an insertion direction;
- a blocking member which is movable relative to the female member, inside the inner cavity, between a rest position, in which the blocking member allows the male member to be inserted into the female member in the insertion direction, and an operative position, in which the blocking member cooperates with the male member in order to block the male member relative to the female member at least in the insertion direction, the blocking member being movable from its rest position to its operative position by the actuator.

According to a sixth aspect, the invention relates to a motor vehicle comprising:
- a body;
- a dashboard having a transverse cross-member;
- at least two attachment devices having the above features, the attachment devices rigidly attaching two ends of the cross-member to rigid elements of the body;
the body having body sides which are arranged laterally towards the outside of the vehicle relative to said rigid elements, the body sides having through-orifices allowing access to the heads of the screws of the attachment devices.

BRIEF DESCRIPTION OF THE DRAWINGS

Other features and advantages of the invention will become apparent from the detailed description thereof which is given hereinbelow, by way of example and without implying any limitation, with reference to the accompanying figures, in which.

DETAILED DESCRIPTION OF THE PREFERRED EMBODIMENTS

In the description which follows, the longitudinal and transverse directions will be understood relative to the normal direction of movement of the vehicle.

Figure 3:
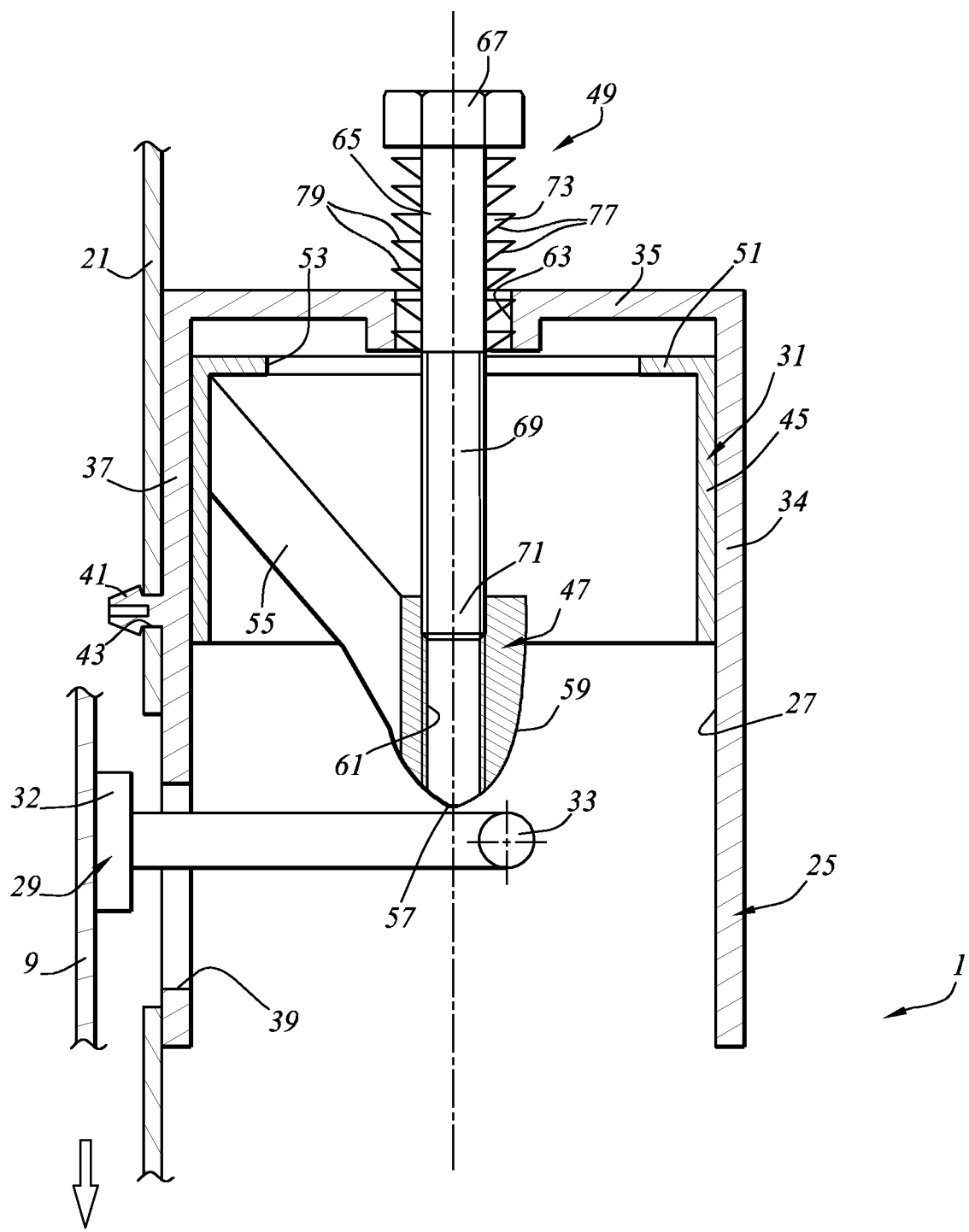
FIG. 3 is a view, in diagrammatic form and in axial section, of one of the attachment devices of FIG. 2, the blocking member of the attachment device being in its rest position.
Figure 4:
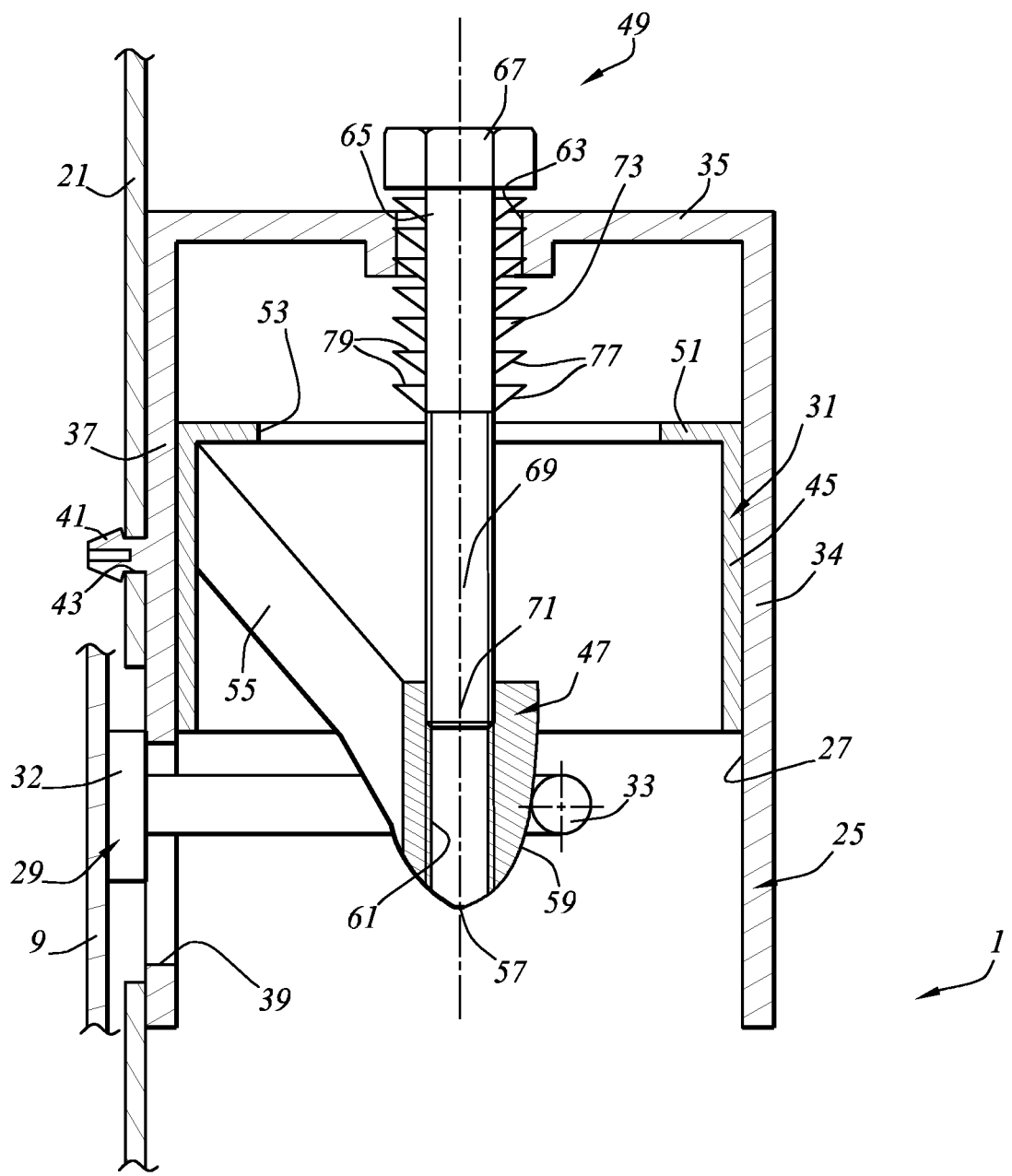
FIG. 4 is a cutaway view similar to that of FIG. 3, the blocking member being in its operative position.
Figure 5:
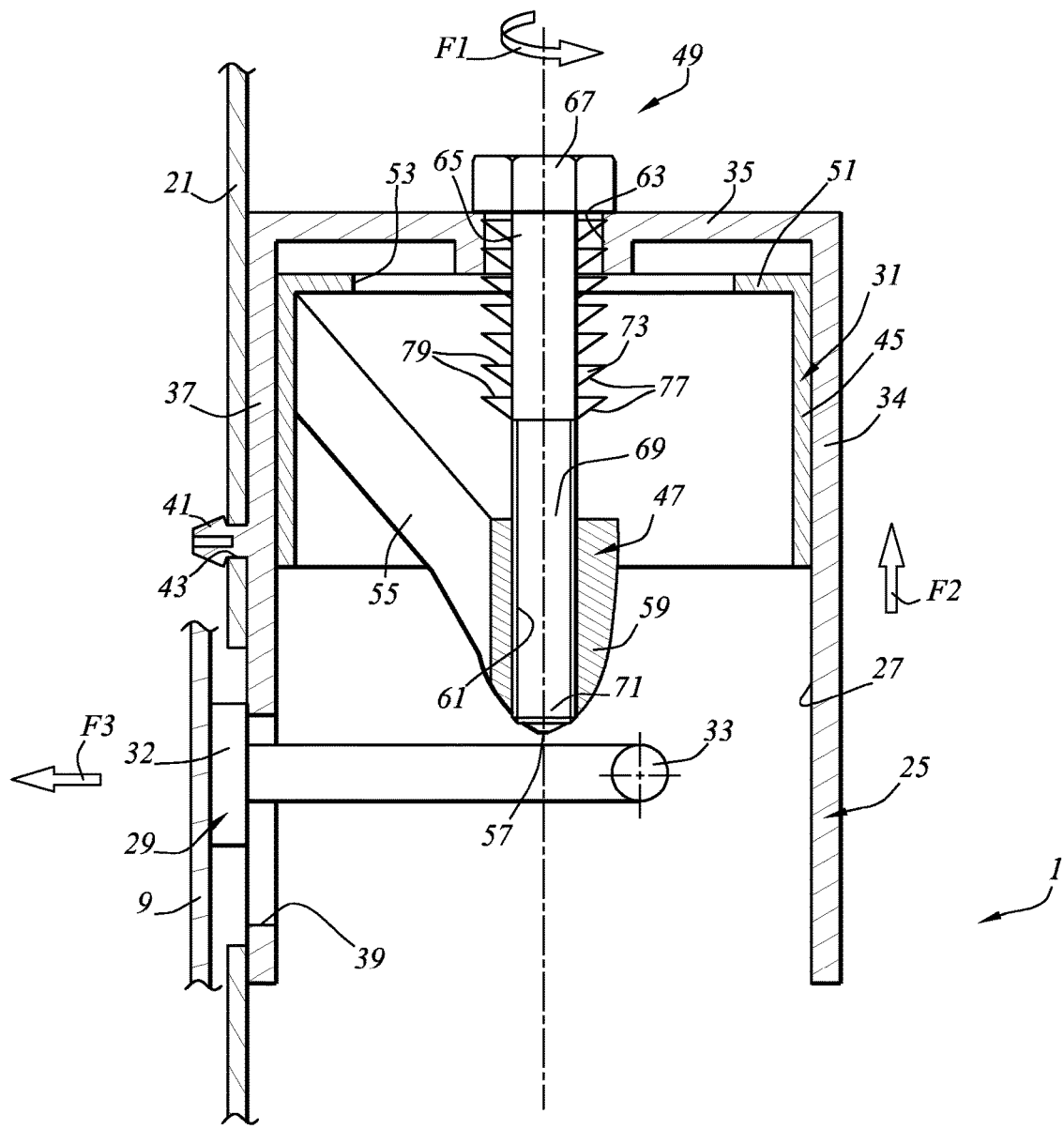
FIG. 5 is a cutaway view similar to FIGS. 3 and 4, after retraction of the blocking member from its operative position to its rest position in order to dismantle the dashboard.

The device shown especially in FIGS. 3 to 5 is provided in order to attach a first structural or functional sub-assembly of the vehicle to a second structural or functional sub-assembly of the vehicle. Accordingly, it is, for example but not exclusively, suitable for attaching the dashboard to the body of the vehicle or for attaching a seat to the body of the vehicle.

Figure 1:
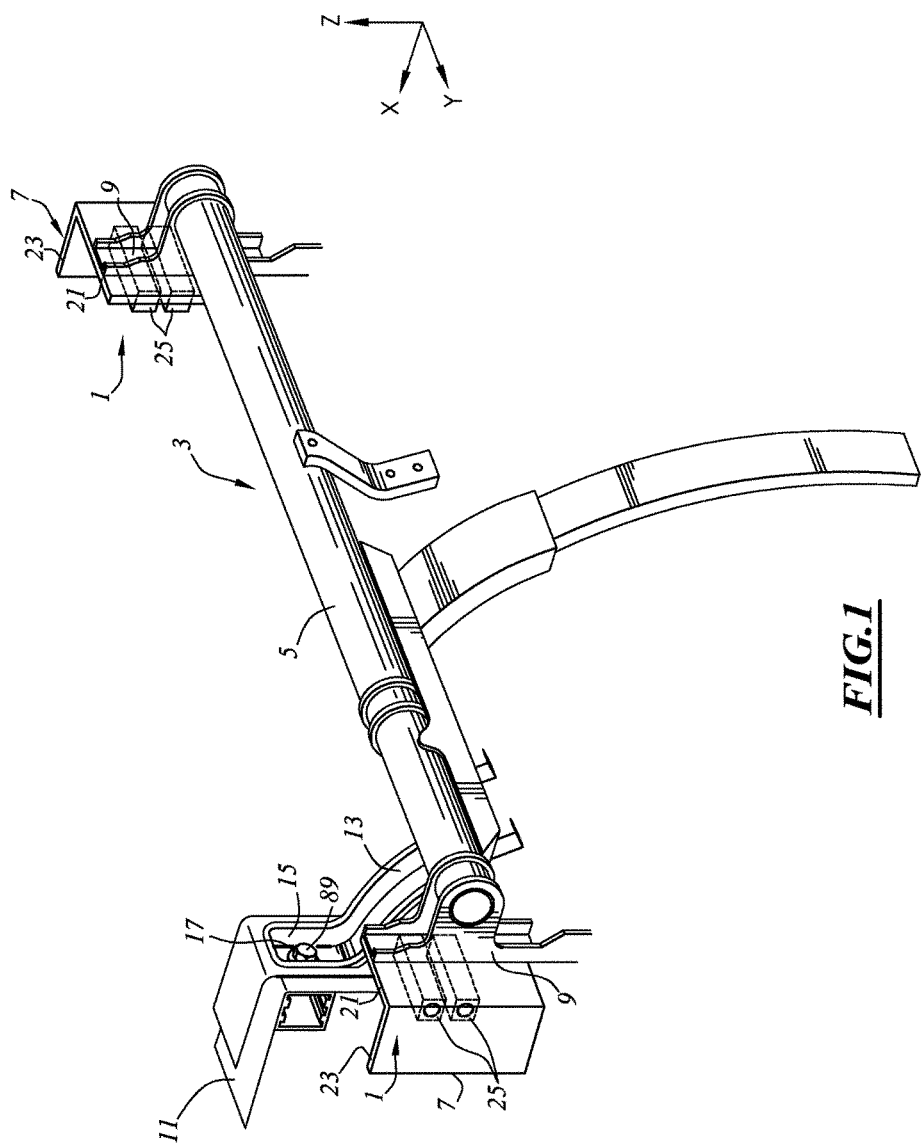
FIG. 1 is a perspective view, in diagrammatic form, showing a dashboard cross-member attached to body brackets by attachment devices according to the invention.

As is shown in FIG. 1, the purpose of the attachment device 1 is to rigidly attach a structural element of the dashboard 3, for example the cross-member 5 of the dashboard, to a structural element 7 of the vehicle.

The cross-member 5 is generally attached to the body at three points. It is attached to two body brackets 7 at its two opposite ends by way of stirrups 9. It is also attached to the windscreen lower cross-member 11 by way of an attachment leg 13 called a windscreen lower cross-member link. The windscreen lower cross-member link 13 is integral with the cross-member 5. It additionally has a support and attachment portion 15 facing the windscreen lower cross-member 11. The windscreen lower cross-member passes transversely beneath the windscreen of the vehicle. The portion 15 is attached to the cross-member 11 by way of automatic release attachment devices 17, of the type described in the patent applications having application numbers FR 06 54 349, FR 07 00 490, FR 07 02 560 and FR 07 56 711.

The automatic attachment means 17 comprise a female member attached to the windscreen lower cross-member and a male member attached to the portion 15 of the windscreen lower cross-member link, insertion of the male member into the female member automatically effecting locking of the male member and the female member relative to one another.

The stirrups 9 are each rigidly attached to a bracket 7 by one, preferably by two, attachment device(s) of the type shown in FIGS. 3 to 5.

Figure 2:
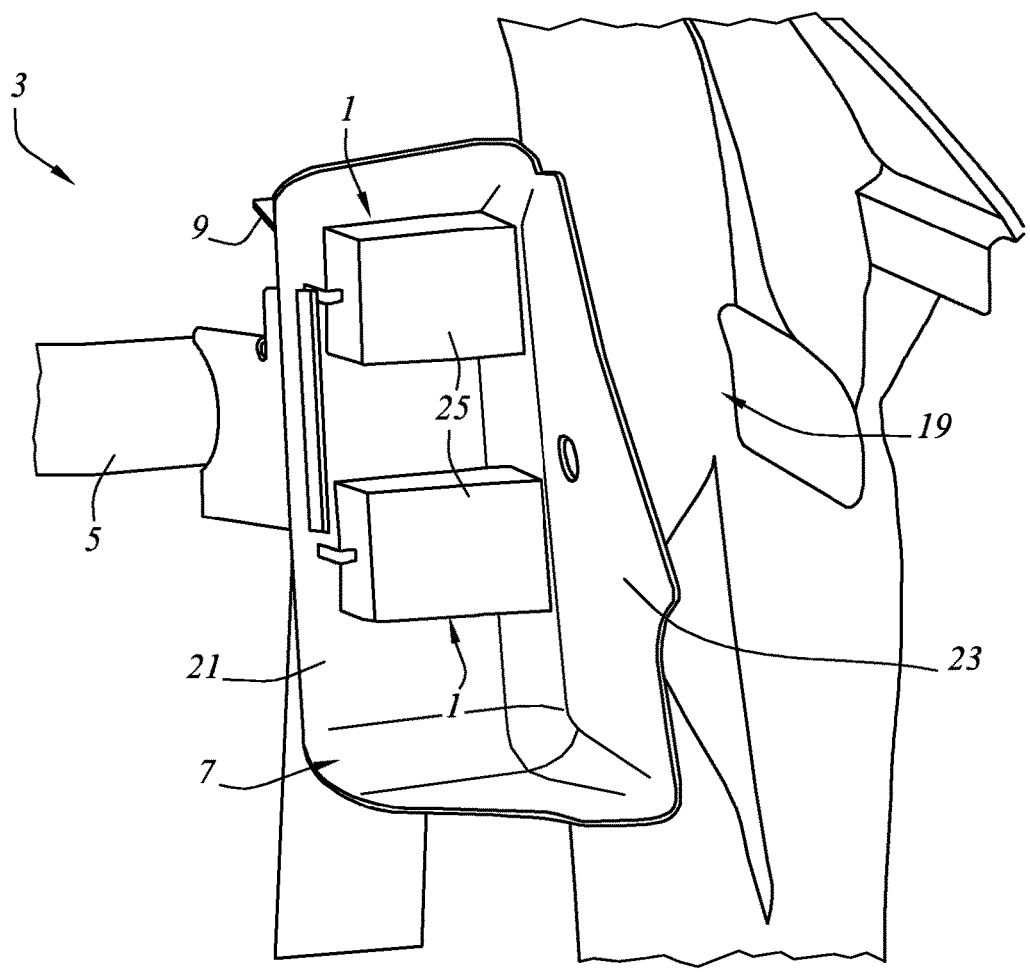
FIG. 2 is a perspective view of a bracket of FIG. 1 carrying two attachment devices, and of a body side to which the bracket is attached.

As will be seen in FIG. 2, the body brackets 7 are rigidly attached to the body sides 19. The brackets 7 each comprise a transverse wing 21, which faces the corresponding stirrup 9, and a substantially longitudinal wing 23, which is rigidly attached to the body side. The wing 23 extends forwards from an edge of the wing 21 facing the outside of the vehicle.

As is shown in FIGS. 3 to 5, each attachment device 1 comprises:
  a female member 25 which is arranged to be attached to the wing 21 of one of the brackets 7 and defines an inner cavity 27 on the inside;
  a male member 29 which is arranged to be attached to a stirrup 9, the male member 29 being capable of insertion into the inner cavity 27 of the female member in a longitudinal insertion direction;
  a blocking member 31 which is movable relative to the female member 25, inside the inner cavity 7, between a rest position (FIG. 3), in which the blocking member allows the male member 29 to be inserted into the female member 25 in the insertion direction, and an operative position (FIG. 4), in which the blocking member cooperates with the male member in order to block the male member 29 relative to the female member in the insertion direction.

The male member 29 is a rectangular loop comprising four sections which are perpendicular to one another and delimit a central rectangular orifice on the inside. The loop 29 is rigidly attached to the stirrup 9 by a section 32, for example by way of welds. The section 33 parallel to and opposite the section 32 has a circular cross-section. The loop 29 is oriented so that it extends in a plane perpendicular to the transverse direction. It projects forwards relative to the stirrup 9.

The female member 25 comprises a tubular outer casing 34 which has a central axis arranged to be transverse and a rectangular cross-section perpendicular to its axis. The casing 34 is closed by a bottom 35 at a first axial end and is open at its opposite axial end. The casing 34 has, on a wall 37 arranged to be perpendicular to the insertion direction, an opening 39 for the passage of the male member 29. The opening 39 is, for example, rectangular and is arranged close to the open axial end of the casing.

The casing 34 defines the cavity 27 on the inside.

The female member 25 is attached to a face of the wing 21 facing the front of the vehicle, that is to say remote from the stirrup 9. It is oriented so that the bottom 35 faces the outside of the vehicle, the open end of the casing facing the inside of the vehicle. The female member 25 is attached to the wing 21 by way of a clip 41 provided on the wall 37, the clip 41 being engaged in an orifice 43 of the wing 21.

The blocking member 31 comprises:
  a tubular part 45 for guiding the blocking member relative to the female member;
  a bolt 47 which is arranged to cooperate with the loop 29 in order to block the male member relative to the female member.

In addition, the attachment device comprises a metalloplastic screw 49 capable of cooperating with a linear actuator (FIG. 6) in order to move the blocking member from its rest position to its operative position.

The guide part 45 is a hollow tubular element, coaxial with the female member, having a rectangular cross-section perpendicularly to the transverse direction. The outside cross-section of the part 45 corresponds substantially to the inside cross-section of the casing 34. The part 45 is closed at a first axial end by a bottom 51 provided with a central opening 53. The part 45 is open at the opposite axial end.

The bolt 47 is arranged substantially on the central axis of the casing 34 and of the guide part 45. It is rigidly attached to the guide part 45 by way of an arm 55. The bolt 47 has a tapered nose 57 and a concave face 59 which faces forwards. The nose points transversely towards the inside of the vehicle. The concave face 59, when considered in cross-section in a horizontal plane as in FIGS. 4 to 6, extends towards the front and towards the outside of the vehicle, starting from the nose 57. Its concavity faces the front of the vehicle. The curvature of the face 59 is more pronounced close to the nose 57 and decreases towards the outside of the vehicle.

The bolt 47 comprises an internally tapped blind hole 61 which extends according to the central axis of the casing 34, open towards the outside of the vehicle. In a variant, the hole 61 is open.

The metalloplastic screw 49 is engaged in a circular orifice 63 formed in the centre of the bottom 35 of the casing. The screw 49 extends according to the central axis of the casing 34. The screw 49 is free in translation axially and in rotation relative to the female member 25. It has an outer portion 65 terminated by a hexagonal head 67, and an inner portion 69 which extends the outer portion 65 remote from the head 67.

The inner portion 69 is threaded, its thread being matched to the tap of the hole 61. The inner portion 69 has an end portion 71 which is screwed into the tapped hole 61. The end portion 71 extends, for example, over a third of the total length of the inner portion 69.

The outer portion 65, the head 67 and the inner portion 69 are made of metal. In addition, the screw 49 comprises a plastics material 73 which is overmoulded around the outer portion 65. The plastics material is shaped so that it forms a plurality of axially superposed collars 75 around the outer portion 65. The collars 75 are all identical and coaxial. They are delimited towards the inside of the vehicle by a tapered face 77 and towards the outside of the vehicle by a planar face 79 substantially perpendicular to the transverse axial direction.

Each of the faces 77 widens from the inside to the outside of the vehicle.

The diameter of the outer portion 65 is smaller than the diameter of the orifice 63. The diameter of the collars 75, on the other hand, is larger than that of the orifice 63.

The rest position of the blocking member is shown in FIG. 3. The guide part 45 is located in the inner cavity 27 close to the bottom 35. The head 67 of the screw and the outer portion 65 project axially towards the outside of the female member relative to the bottom 35.

The end of the portion 65 remote from the head is engaged in the hole 61.

In this position, the collars 75 constitute braking members. They cooperate with the edge of the orifice 63 to hold the blocking member in its rest position when the blocking member is urged axially, by way of the transmission member 49, towards its operative position with a degree of intensity less than or equal to a predetermined limit. The predetermined limit is typically from 20 kg to 100 kg and preferably from 50 kg to 81 kg.

On the other hand, the collars 75 allow the blocking member to move from its rest position towards its operative position when the blocking member is urged, by way of the transmission member 49, towards its operative position with a degree of intensity greater than the predetermined limit.

The bolt 47 is offset axially relative to the opening 39, no region of the bolt 47 being located opposite the opening 39.

In the position shown in FIG. 3, an actuator arranged outside the inner cavity of the female member is capable of coming to bear on the head 67 of the metalloplastic screw so as to cause the blocking member to move from its rest position to its operative position.

The operative position of the blocking member is shown in FIG. 4. The head 67 of the screw is located immediately next to and outside the bottom 35 of the casing. The outer portion of the screw is located almost entirely inside the female member. The end of the portion 65 adjacent to the head 67 is engaged in the orifice 63. In this position, the collars 75 constitute anti-return means. They cooperate with the edge of the orifice 63 in order to block the movement of the blocking member 31 axially from its operative position towards its rest position.

When the male member 29 is inserted in the female member, and when the blocking member is in its operative position, the bolt 47 of the blocking member is engaged in the central orifice of the loop, the concave face 59 being in abutment against the section 33. Owing to the shape of the concave face 59, the bolt 47 urges the section 33 of the loop longitudinally, towards the front of the vehicle.

Figure 6:
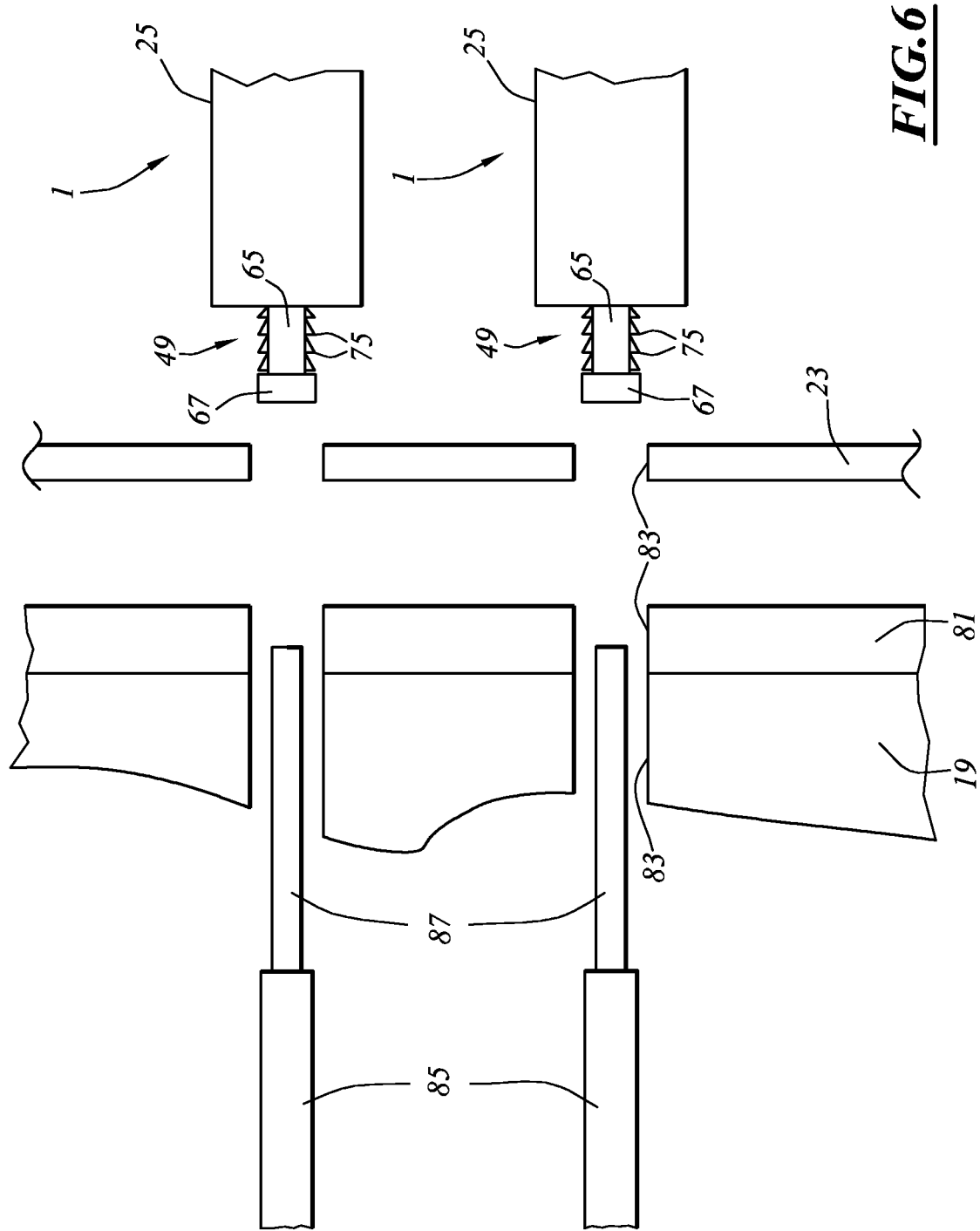
FIG. 6 is a cutaway representation, in diagrammatic form, of the body side and of the attachment devices of FIG. 2.

As is shown in FIG. 6, the body of the vehicle comprises body sides 19 and body linings 81, which are arranged laterally towards the outside of the vehicle relative to the wings 23 of the brackets carrying the female members. On each side of the vehicle, the body side 19, the body lining 81 and the wing 23 are provided with slots 83 arranged axially as a continuation of one another. The slots 83 are arranged axially as a continuation of the screws 49. They allow access to the heads 67 of the screws from outside the vehicle.

The process for attaching the dashboard 3 to the body of the vehicle will now be described in detail.

The female members 25 are first attached to the wings 21 of the body brackets 7. To that end, the clips 41 are engaged in the orifices 43. For example, two female members 25 are arranged one above the other, with their axes oriented transversely. At the time when the female members are attached, the blocking members are in the rest position. The heads 67 of the metalloplastic screws are oriented towards the outside of the vehicle.

The male members 29 are then rigidly attached, for example by welding or bolting, to the stirrups 9 of the dashboard. The male members point towards the front of the vehicle and are located in planes perpendicular to the transverse direction.

The dashboard 3 is grasped by a gripper (not shown) and is brought up to the body so as to position the male members of the attachment devices 1 and 17 longitudinally behind the female members of said devices 1 and 17. The dashboard 3 is then moved forwards so as to cause the male members of the devices 1 and 17 to be inserted into the female members of said devices.

When the male member of the device 17 has penetrated the female member sufficiently, locking of the male member in the female member is automatically triggered, a blocking member moving inside the female member under the action of a resilient member. The blocking member blocks the male member of the device 17 longitudinally relative to the female member.

It will be noted that, during the attachment of the dashboard 3 to the windscreen lower cross-member 11 with the aid of the device 17, the male members of the attachment devices 1 of the ends of the cross-member remain free in relation to the female members of the same devices 1. Once the attachment device 17 has been activated, the ends of the cross-member 5 substantially occupy their nominal positions, with a longitudinal offset of from 0 to 2 millimeters relative to that nominal position.

The attachment devices 1 of the ends of the cross-member are then locked. Locking can be effected by an operator. Alternatively, a sensor can detect that the blocking member of the attachment device 17 has reached the position in which it locks the male member relative to the female member and automatically transmit that information to a computer. The computer commands the locking of the attachment devices 1 of the ends of the cross-member. Such sensors are described in the patent application filed under number FR 07 02 560.

The attachment devices 1 are locked by linear actuators 85 mounted on the dashboard gripper (FIG. 6). The linear actuators are typically pneumatic or hydraulic jacks. The rods 87 of the jacks are located as an axial continuation of the orifices 83. In order to move the blocking member of each attachment device from its rest position to its operative position, the rods of the jacks 87 are deployed. They engage in the orifices 83 and abut the heads 67 of the screws, in order to urge them towards the inside of the vehicle, that is to say towards the inside of the female member. The force applied is greater than the predetermined limit indicated above, so that the blocking members 31 move from their rest positions to their operative positions. The blocking members then lock the male members 29 relative to the female members.

The rods 87 of the jacks are then retracted, and the gripper is separated from the dashboard. Plugs made of plastics material are placed on the orifices 83 of the body sides. The dashboard then occupies its use position relative to the body.

The dashboard can be dismantled from the body according to the following process.

The plugs made of plastics material are first removed from the orifices 83. The blocking member of each attachment device 1 is then withdrawn from the loop 29. To that end, a rotary tool provided with an end piece of a shape adapted to the head 67 is introduced into the orifices 83 located as a continuation of the screw of the attachment device. The rotary tool is coupled to the head of the screw, and the screw is driven in rotation in a direction suitable for effecting more pronounced engagement of the inner portion 69 of the screw in the tapped hole 61 of the bolt (arrow F1 of FIG. 5). The head 67 of the screw first comes into abutment against the bottom 35 of the female member and then, secondly, the blocking member moves towards the outside of the vehicle relative to the female member along the screw. This movement is denoted by arrow F2 in FIG. 5.

Once the bolt of the blocking member has been removed entirely from the loop, it is free to be removed from the female member through the opening 39, according to a movement denoted by arrow F3 in FIG. 5.

Of course, before the dashboard 3 can be completely separated from the body of the vehicle, it is necessary to free the male member of the attachment device 17 from the corresponding female member. This can be carried out, for example, by unscrewing the screw 89 which connects the male member of the device 17 to the portion 15 of the windscreen lower cross-member link (see FIG. 1).

The attachment device described above has multiple advantages.

Because the attachment device does not have an actuator capable of moving the blocking member from its rest position to its operative position, the blocking member being movable from its rest position to its operative position by an actuator arranged outside the inner cavity, the attachment device is much lighter. It comprises fewer parts and is therefore simpler and less expensive. The plastics material overmoulded on the screw allows the blocking member to be held in place in the rest position and acts as an anti-return means, preventing the blocking member from returning to its rest position once it has reached its operative position.

These two functions are therefore fulfilled in an economical and simple manner. It will be noted that, when in the rest position, the blocking member is subjected to only relatively weak forces, so that it is not necessary to provide complex locking means.

Freeing of the male member relative to the female member is carried out easily from the lateral side of the vehicle.

The attachment device can have multiple variants.

It is suitable not only for attaching a dashboard to the body of the motor vehicle, but also for attaching other sub-assemblies such as a seat to the body or to another part of the vehicle.

The male member can be mounted on the body and the female member on the dashboard.

The female member is not necessarily oriented with its central axis transverse, it being possible for its central axis to adopt any suitable orientation, vertical, longitudinal, oblique, etc.

The direction of insertion of the male member into the female member is not necessarily longitudinal but can be any direction, for example transverse, vertical, oblique, etc.

The blocking member preferably moves in translation from its rest position to its operative position. In a variant which is not preferred, the blocking member could move in rotation or according to a combination of translation and rotation.

The actuator causing the blocking member to move from its rest position to its operative position is preferably a linear actuator. However, in a variant, the actuator could be a rotary actuator. In that case, the outer portion of the screw does not have an overmoulding of plastics material but carries a thread of very fine pitch. The orifice 63 in the bottom of the female member, in which the outer portion of the screw is engaged, is threaded. Movement of the blocking member from its rest position to its operative position is effected by turning the screw. Because the thread of the screw is very inclined, it is necessary to exert a very considerable axial force in order to cause the screw to rotate and move relative to the female member. Accordingly, the thread acts both as a braking means and as an anti-return means.

Figure 7:
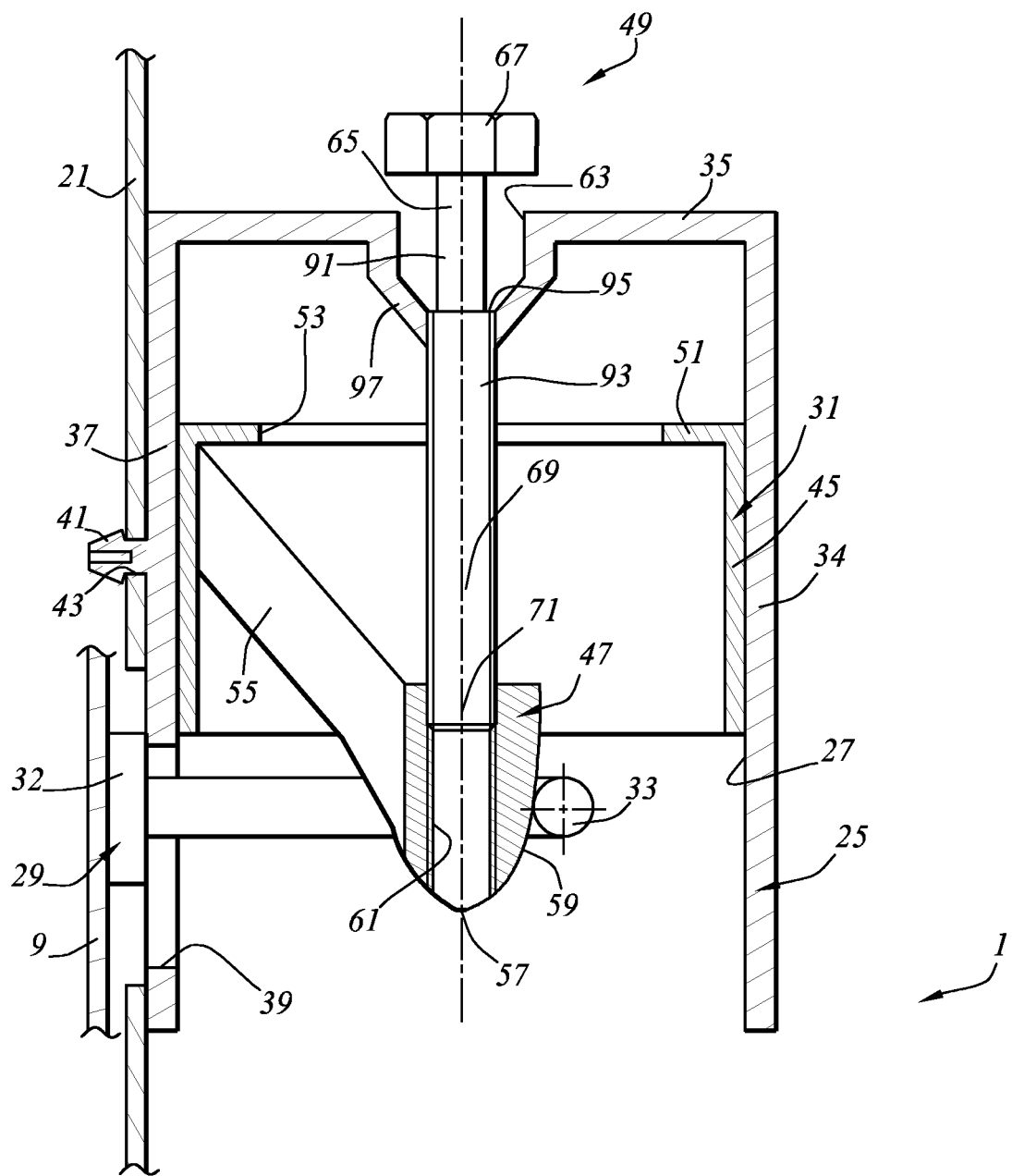
FIG. 7 is a view analogous to that of FIG. 4 and shows a second embodiment of the invention.
Figure 8:
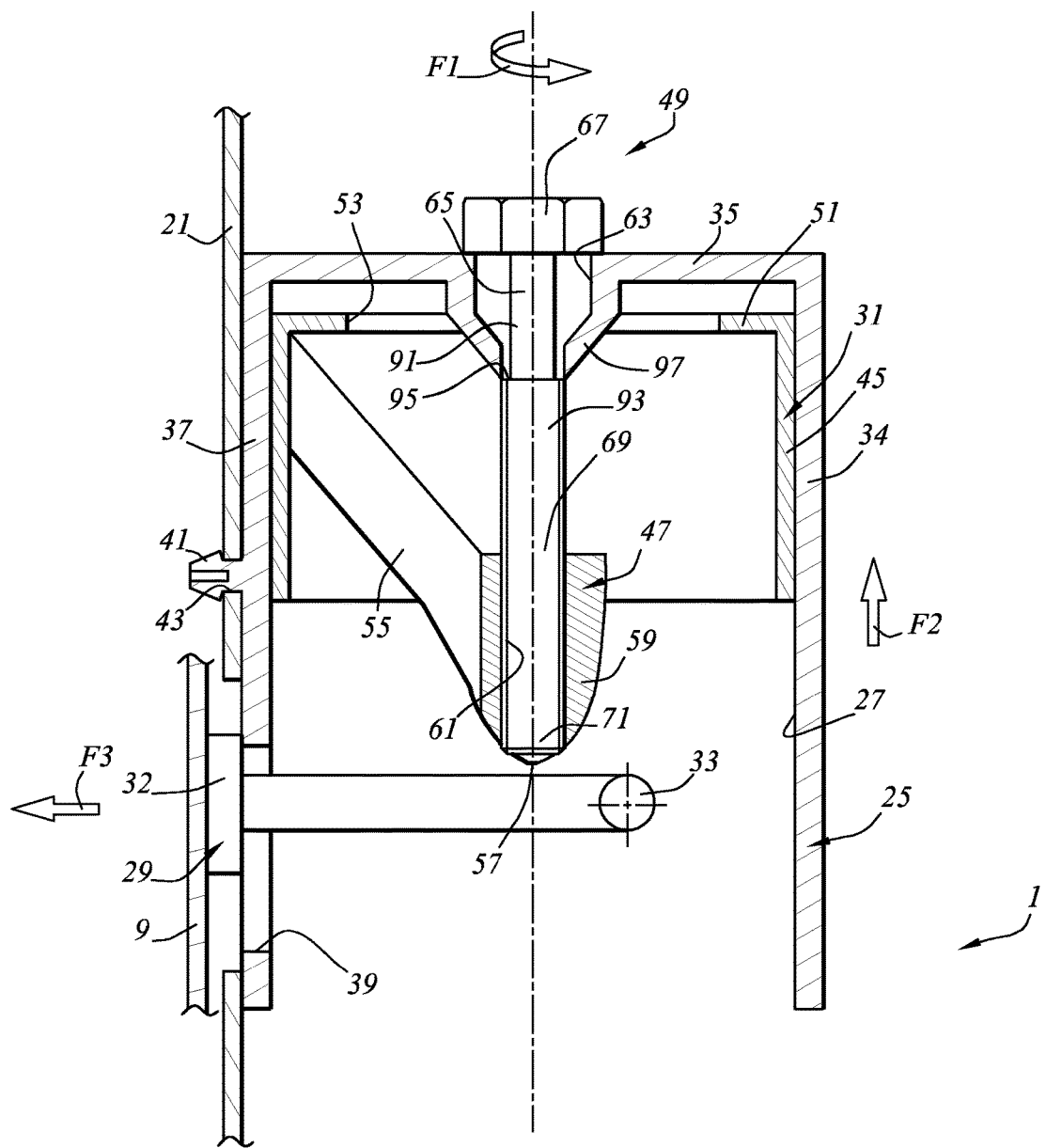
FIG. 8 is a view analogous to that of FIG. 5, for the second embodiment of the invention.
Figure 9:
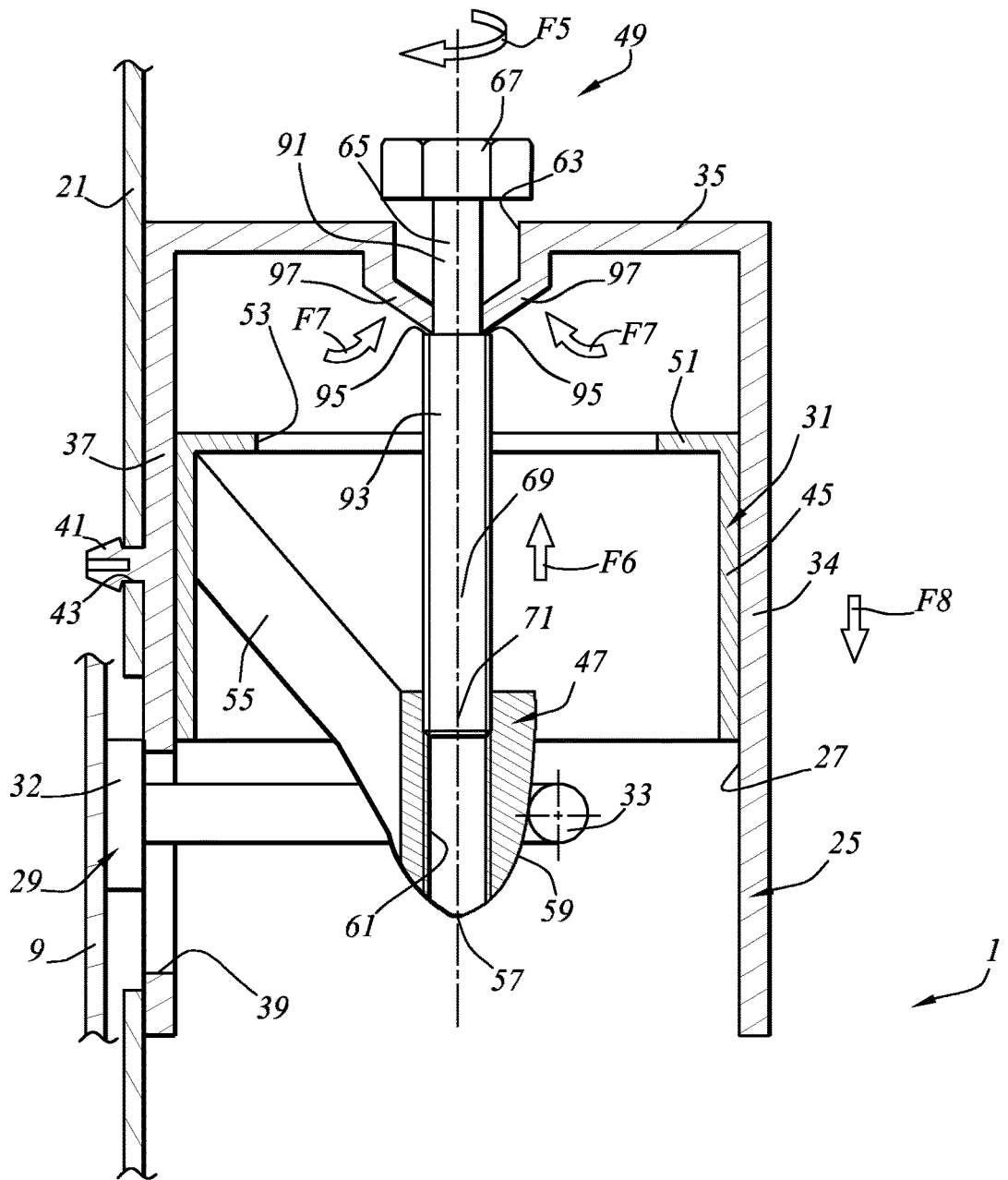
FIG. 9 is a cutaway view similar to that of FIGS. 7 and 8, after the blocking member has been returned to the operative position from its rest position in order to re-mount the dashboard.

FIGS. 7 to 9 show a second embodiment of the invention, in which elements analogous to the first embodiment described above are denoted by identical reference numerals.

Only the points in which the second embodiment differs from the first will be described hereinbelow.

According to the second embodiment, the screw 49 is made only of metal and does not have plastics material overmoulded around the outer portion 65.

The outer portion 65, which can be seen in FIG. 7, comprises a portion 91 proximal to the head 67 and a portion 93 distal to the head 67. The distal portion 93 is threaded, its thread being identical with the thread of the inner portion 69 and extending the inner portion 69 in a continuous manner towards the head 67.

The proximal portion 91 is cylindrical in shape and has a smooth outer surface. The outside diameter of the proximal portion 91 is smaller than the outside diameter of the distal portion 93 and is also smaller than the minimum diameter of the thread of the distal portion 93.

A shoulder 95 is formed in the outer portion 65, as is shown in FIG. 7. The shoulder 95 is located at the boundary between the proximal portion 91 and the distal portion 93. The shoulder 95 is formed by the difference in the outside diameters of the distal portion 93 and the proximal portion 91. The shoulder 95 is generated by revolution about the central axis of the casing 34.

The female member 25 comprises tongues 97 formed at the axial end of the orifice 63 remote from the head 67 of the screw. The tongues 97 are, for example, integral with the bottom 35 of the casing. The tongues 97 are inclined relative to the direction of the central axis of the casing 34. They extend, starting from the edge of the orifice 63, radially towards the central axis of the casing 34 and axially towards the inside of the casing 34. The female member 25 has, for example, two tongues 97 which are diametrically opposite relative to the central axis of the casing 34. In a variant, the female member 25 has more than two tongues 97, the tongues 97 being distributed substantially equally at an angle on the circle formed by the end of the orifice 63 remote from the head 67.

The tongues 97 are made of plastics material and have a certain resilience. The tongues 97 are arranged to cooperate with different parts of the screw 49.

The tongues 97 are arranged to be in abutment against the thread of the inner portion 69 when the blocking member 31 is in the rest position. The tongues 97 accordingly define braking means capable of holding the blocking member 31 in the rest position when said blocking member 31 is urged towards its operative position with a degree of intensity less than or equal to a predetermined limit, and of allowing the blocking member 31 to move from its rest position towards its operative position when said blocking member 31 is urged towards its operative position with a degree of intensity greater than said predetermined limit.

The tongues 97 are also arranged to cooperate with the thread of the distal portion 93 when the blocking member 31 is in the operative position, defining anti-return means which are capable of blocking the movement of the blocking member 31 from its operative position towards its rest position.

The tongues 97 are also arranged to be in axial abutment against the shoulder 95 when the head 67 of the screw is in contact with the bottom 35 of the casing.

The functioning of this second embodiment is identical with that of the first embodiment as regards the process of initially attaching the dashboard 3 to the body of the vehicle and the process of dismantling the dashboard 3 from said body of the vehicle. The tabs 97 define in particular the braking means capable of holding blocking member 31 in its rest position, as well as the anti-return means capable of blocking the movement of the blocking member 31 from its operative position towards its rest position, analogously to the collars 75 of the invention according to the first embodiment.

When the dashboard 3 is dismantled from the body of the vehicle, the operator rotates the head 67 according to arrow F1 (FIG. 8), with the aid of the second rotary actuator. This rotation of the head 67 causes the thread of the inner portion 69 to be screwed into the tap of the hole 61. This screwing itself produces axial translation of the screw 49 until the head 67 comes into contact with the bottom 35. During the translation of the screw 49, the tongues 97 pass from lateral abutment against the thread of the distal portion 93 when the blocking member 31 is in the operative position to axial abutment against the shoulder 95 of the screw.

The process of re-mounting the dashboard 3 on the body of the vehicle according to the second embodiment will now be described in detail with the aid of FIGS. 8 and 9.

Initially, the blocking member 31 is in the rest position and the head 67 is in contact with the bottom 35 of the casing, so that most of the thread of the inner portion 69 is received in the tap of the hole 61, as is shown in FIG. 8. In this position, the male member 29 is free relative to the female member 25.

An operator then begins by acting, with the aid of a second rotary actuator (not shown), on the head 67 of the screw 49 in the direction of arrow F5, which is shown in FIG. 9. During this step, the tongues 97 are solely in abutment against the shoulder 95. Because the resilient resistance of the plastics material of the tongues 97 in this position is lower than the frictional force between the guide part 45 of the blocking member and the casing 34 of the female member, rotation of the screw 49 in the direction of arrow F5 firstly causes the head 67 of the screw to move away from the bottom 35 (arrow F6). The translation of the screw 49 according to arrow F6 is due to the unscrewing of the thread of the inner portion 69 relative to the tap of the hole 61.

Because the shoulder 95 is in abutment against the tongues 97, the translation of the screw 49 according to the direction of the central axis of the casing 34 in the direction of arrow F6 causes the tongues 97 to bend, thus increasing their inclination relative to the central axis of the casing 34, as is shown by arrows F7.

Bending of the tongues 97 has the effect of increasing the pressure of the tongues against the shoulder 95. The translation of the screw 49 according to arrow F6 is stopped when the pressure of the tongues 97 against the shoulder 95 is greater than the frictional force between the guide part 45 and the casing 34.

In the following step of this re-mounting process, the operator continues to turn the head 67 of the screw relative to the central axis of the casing 34 in the direction of arrow F5 with the aid of the second rotary actuator. The screw 49 is then movable only in rotation about the central axis of the casing 34, translation according to arrow F6 being stopped. Rotation of the head 67 of the screw according to arrow F5 still causes the thread of the inner portion 69 to unscrew relative to the thread of the hole 61. Because the pressure of the tongues 97 against the shoulder 95 is greater than the frictional force of the guide part 45 against the casing 34, translation of the bolt 47 of the blocking member relative to the screw 49 due to the unscrewing of the inner portion 69 relative to the hole 61 causes translation of the blocking member 31 relative to the female member 25 from its rest position towards its operative position (arrow F8). The operator then stops rotating the head 67 according to arrow F5 when the blocking member 31 is in the operative position, as is shown in FIG. 9. The operator thus completes the process of re-mounting the dashboard 3 on the body of the vehicle.

In order to dismantle the dashboard 3 from the body of the vehicle again, the operator rotates the head 67 of the screw according to arrow F1, which can be seen in FIG. 8, with the aid of the second rotary actuator. This rotation of the head 67 in the direction of arrow F1 causes the thread of the inner portion 69 to be screwed into the thread of the hole 61. Screwing of the inner portion 69 relative to the hole 61 itself causes translation of the screw 49 according to the central axis of the casing 34 in the opposite direction to the arrow F6, which can be seen in FIG. 9, until the head 67 comes into contact with the bottom 35. When the head 67 is in contact with the bottom 35, continued screwing of the inner portion 69 relative to the hole 61 causes translation of the blocking member 31 from its operative position towards its rest position relative to the female member 25, as is shown by arrow F2 in FIG. 8.

The invention according to the second embodiment thus allows re-mounting of the dashboard 3 on the body of the vehicle in service after sale to be improved, because it is not necessary in this case to use the first linear actuator 85.

In a variant, in the case of a linear actuator, the outer portion of the screw does not have an overmoulding of plastics material but carries a thread of very fine pitch.

In a variant, the tongues 97 are produced with an overmoulded metal part.

According to a second aspect of the invention, which is independent of the first aspect of the invention described above, the device for attaching a first structural or functional sub-assembly to a second structural or functional sub-assembly of a motor vehicle comprises:

a female member which is connected to the second sub-assembly and defines an inner cavity on the inside;

a male member connected to the first sub-assembly, the male member being capable of insertion into the inner cavity of the female member in an insertion direction;

a blocking member which is movable relative to the female member, inside the inner cavity, between a rest position, in which the blocking members allows the male member to be inserted into the female member in the insertion direction, and an operative position, in which the blocking member cooperates with the male member in order to block the male member relative to the female member, at least in the insertion direction;

a transmission member having an inner portion, which is arranged in the inner cavity and is connected to the blocking member, and a head, which is arranged outside the inner cavity and is capable of cooperating with a rotary actuator, the transmission member having at least one degree of freedom relative to the female member.

The attachment device is characterized in that the female member comprises tongues which are arranged to cooperate with the transmission member, and in that the transmission member comprises an outer portion, which is located outside the inner cavity, and a shoulder, which is formed in the outer portion and is capable of being in abutment against the tongues, the blocking member being movable from its rest position to its operative position by a rotary actuator capable of acting upon the head of the transmission member in order to cause the transmission member to rotate relative to the blocking member in a direction causing the blocking member to move relative to the female member along the transmission member from its rest position towards its operative position, the shoulder of the outer portion being in abutment against the tongues during at least part of said movement of the blocking member.

The invention claimed is:

1. An assembly for attaching a first structural or functional sub-assembly to a second structural or functional sub-assembly of a motor vehicle, the attachment assembly comprising:
   an attachment device arranged to attach the first sub-assembly in a predetermined use position relative to the second sub-assembly, the attachment device comprising:
      a female member which is connected to the second sub-assembly and defines an inner cavity on the inside,
      a male member connected to the first sub-assembly, the male member being configured to be inserted into the inner cavity of the female member in an insertion direction, and
      a blocking member which is movable relative to the female member, inside the inner cavity, between a rest position, in which the blocking member allows the male member to be inserted into the female member in the insertion direction, and an operative position, in which the blocking member cooperates with the male member in order to block the male member relative to the female member at least in the insertion direction; and
   an actuator arranged outside the inner cavity and being a distinct and separate device with regard to the attachment device,
   wherein the blocking member is movable from the rest position to the operative position by the actuator.

2. The assembly according to claim 1, further comprising a gripper configured to move the first sub-assembly to the use position, the actuator being connected to the gripper.

3. The assembly according to claim 1, wherein the actuator is a linear actuator.

4. The assembly according to claim 1, wherein the blocking member is movable relative to the female member inside the inner cavity along a central axis of the female member.

5. The assembly according to claim 1, anti-return means configured to block the movement of the blocking member from the operative position towards the rest position.

6. The assembly according to claim 1, further comprising:
   a transmission member having an inner portion, which is arranged in the inner cavity and is connected to the blocking member, the transmission member having at least one degree of freedom relative to the female member; and
   a head, which is arranged outside the inner cavity and is configured to cooperate with the actuator.

7. The assembly according to claim 6, wherein the transmission member is a screw, the inner portion of which comprises a threaded zone, the blocking member comprising a tapped hole in which the threaded zone is engaged so as to allow the blocking member to move relative to the female member along the screw under the effect of the rotation of the screw relative to the blocking member.

8. The assembly according to claim 6, wherein the transmission member comprises:
   an outer portion, which is located outside the inner cavity, and
   a plastic material overmoulded on the outer portion, the plastic material defining braking means configured to hold the blocking member in the rest position when said blocking member is urged towards the operative position with a degree of intensity less than or equal to a predetermined limit, and to allow the blocking member to move from the rest position towards the operative position when said blocking member is urged towards the operative position with a degree of intensity greater than said predetermined limit.

9. The assembly according to claim 8, wherein the over-moulding of the plastic material defines anti-return means configured to block the movement of the blocking member from the operative position towards the rest position.

10. The assembly according to claim 6, wherein the female member comprises tongues which are arranged to cooperate with the transmission member and define braking means configured to hold the blocking member in the rest position when said blocking member is urged towards the operative position with a degree of intensity less than or equal to a predetermined limit, and to allow the blocking member to move from the rest position towards the operative position when said blocking member is urged towards the operative position with a degree of intensity greater than said predetermined limit.

11. The assembly according to claim 10, wherein the tongues define anti-return means configured to block the movement of the blocking member from the its operative position towards the rest position.

12. The assembly according to claim 10, wherein the transmission member comprises:
   an outer portion, which is located outside the inner cavity, and
   a shoulder, which is formed in the outer portion and is configured to abut against the tongues,
   wherein the blocking member is movable from the rest position to the operative position by a second actuator capable of acting upon the head of the transmission member so as to cause the transmission member to rotate relative to the blocking member in a direction effecting movement of the blocking member relative to the female member along the transmission member from the rest position towards the operative position, the shoulder of the outer portion being in abutment against the tongues during at least part of said movement of the blocking member.

13. A process for attaching a first structural or functional sub-assembly to a second structural or functional sub-assembly of a motor vehicle with the aid of an attachment assembly according to claim 1, the process comprising:
   moving the first sub-assembly to the predetermined use position relative to the second sub-assembly with the aid of a gripper connected to the actuator;
   inserting the male member into the inner cavity of the female member; and
   moving the blocking member relative to the female member, inside the inner cavity, from the rest position to the operative position with the aid of the actuator connected to the gripper.

14. A process for dismantling a first structural or functional sub-assembly attached to a second structural or functional sub-assembly of a motor vehicle with the aid of an attachment assembly according to claim 7, the process comprising causing the transmission member to rotate relative to the blocking member in a direction effecting movement of the blocking member relative to the female member along the transmission member from the operative position towards the rest position by acting upon the head of the transmission member.

15. A process for re-mounting a first structural or functional sub-assembly attached to a second structural or functional sub-assembly of a motor vehicle with the aid of an attachment assembly according to claim 12, the process comprising causing the transmission member to rotate relative to the blocking member in a direction effecting movement of the blocking member relative to the female member along the transmission member from the rest position towards the operative position, wherein the shoulder of the outer portion of the transmission member is in abutment against the tongues of the female member during at least part of the movement of the blocking member.

16. An assembly for attaching a first structural or functional sub-assembly to a second structural or functional sub-assembly of a motor vehicle, the attachment assembly comprising:

an attachment device arranged to attach the first sub-assembly in a predetermined use position relative to the second sub-assembly, the attachment device comprising:
- a female member which is connected to the second sub-assembly and defines an inner cavity on the inside,
- a male member connected to the first sub-assembly, the male member being configured to be inserted into the inner cavity of the female member in an insertion direction, and
- a blocking member which is movable relative to the female member, inside the inner cavity, between a rest position, in which the blocking member allows the male member to be inserted into the female member in the insertion direction, and an operative position, in which the blocking member cooperates with the male member in order to block the male member relative to the female member at least in the insertion direction;

a gripper configured to move the first sub-assembly to the use position; and an actuator connected to the gripper and arranged outside the inner cavity, the actuator being a distinct and separate device with regard to the attachment device, wherein the blocking member is movable from the rest position to the operative position by the actuator.

17. The assembly according to claim 2, further comprising braking means configured to hold the blocking member in the rest position when said blocking member is urged towards the operative position with a degree of intensity less than or equal to a predetermined limit, and to allow the blocking member to move from the rest position towards the operative position when said blocking member is urged towards the operative position with a degree of intensity greater than said predetermined limit.

18. The assembly according to claim 7, wherein the transmission member comprises:
- an outer portion, which is located outside the inner cavity, and
- a plastic material overmoulded on the outer portion, the plastic material defining braking means configured to hold the blocking member in the rest position when said blocking member is urged towards the operative position with a degree of intensity less than or equal to a predetermined limit, and to allow the blocking member to move from the rest position towards the operative position when said blocking member is urged towards the operative position with a degree of intensity greater than said predetermined limit.

19. The assembly according to claim 7, wherein the female member comprises tongues which are arranged to cooperate with the transmission member and define braking means configured to hold the blocking member in the rest position when said blocking member is urged towards the operative position with a degree of intensity less than or equal to a predetermined limit, and to allow the blocking member to move from the rest position towards the operative position when said blocking member is urged towards the operative position with a degree of intensity greater than said predetermined limit.

20. The assembly according to claim 11, wherein the transmission member comprises:
- an outer portion, which is located outside the inner cavity, and
- a shoulder, which is formed in the outer portion and is configured to abut against the tongues, wherein the blocking member is movable from the rest position to the operative position by a second actuator capable of acting upon the head of the transmission member so as to cause the transmission member to rotate relative to the blocking member in a direction effecting movement of the blocking member relative to the female member along the transmission member from the rest position towards the operative position, the shoulder of the outer portion being in abutment against the tongues during at least part of said movement of the blocking member.

* * * * *